United States Patent [19]
DiPietro

[11] Patent Number: 6,103,006
[45] Date of Patent: Aug. 15, 2000

[54] FLUORESCENT POLYMERIC PIGMENTS

[75] Inventor: Thomas C. DiPietro, Medina, Ohio

[73] Assignee: Day-Glo Color Corporation, Cleveland, Ohio

[21] Appl. No.: 09/014,747

[22] Filed: Jan. 28, 1998

[51] Int. Cl.$^7$ .................................................. C09K 11/06
[52] U.S. Cl. .................... 106/493; 252/301.16; 106/496; 106/497; 106/498; 106/506; 106/499
[58] Field of Search ..................................... 106/493, 496, 106/497, 498, 499, 506; 252/301.16

[56] References Cited

U.S. PATENT DOCUMENTS

| | | | |
|---|---|---|---|
| 3,741,971 | 6/1973 | Fuchs et al. | 546/47 |
| 3,812,051 | 5/1974 | Merkle et al. | 252/301.35 |
| 3,915,884 | 10/1975 | Kazenas | 252/301.35 |
| 4,116,923 | 9/1978 | Gattner et al. | 528/220 |
| 4,746,751 | 5/1988 | Oviatt, Jr. et al. | 556/456 |
| 5,030,697 | 7/1991 | Hugl et al. | 525/326.9 |
| 5,155,149 | 10/1992 | Atwater et al. | 524/88 |
| 5,236,621 | 8/1993 | DiPietro | 252/301.35 |

FOREIGN PATENT DOCUMENTS

| | | | |
|---|---|---|---|
| 24 47 024 | 11/1976 | Germany | C09B 57/00 |
| 1245478 | 11/1968 | United Kingdom | C09B 57/00 |
| 1142504 | 2/1969 | United Kingdom | 252/301.16 |

OTHER PUBLICATIONS

Chemical Abstracts, vol. 85, 1976, Abstract No. 22767n "Water soluble benzoxanthene and benziothioxanthene compounds" no month.
Chemical Abstracts, vol. 104, 1986, Abstract No. 207869b "Polymerizable Resin Compositions" no month.
Chemical Abstracts, vol. 91, 1979, Abstract No. 159189u "Use of water–soluble benzoxanthene dyes for fluorescent inks" no month.
Chemical Abstracts, vol. 109, 1988, Abstract No. 149427w "Benzoxanthene–3,4–dicarboximides and benzimidazoxanthenoisoquinolinones" no month.
Chemical Abstracts, vol. 107, 1987, Abstract No. 238560k, "Synthesis of benzoxanthene–3,4–dicarboxylic anhydride derivatives" no month.
Chemical Abstracts, vol. 92, 1980, Abstract No. 216732n "Water–soluble benzoxanthene and benzothioxanthene compounds" no month.
Chemical Abstracts, vol. 100, 1984, Abstract No. 200908x "Electrophotographic recording material" no month.
Chemical Abstracts, vol. 83, 1975, Abstract No. 12197w "Water–insoluble polycyclic dyes" no month.
Chemical Abstracts, vol. 94, Dec. 1980, Abstract No. 123112m, "Benzoxanthene and benzothioxanthene dyes".
Chemical Abstracts, vol. 84, 1976, Abstract No. 6489x "Benzoxanthene dicarboxylic acid imide dyes" no month.

*Primary Examiner*—C. Melissa Koslow
*Attorney, Agent, or Firm*—Calfee, Halter & Griswold, LLP

[57] ABSTRACT

Thermoplastic, non-water soluble, fluorescent pigments having improved lightfastness are provided which are suitable for coloring a variety of materials including plastics, particularly polyolefins, as well as paints, inks and textiles. The pigments of the present invention referred to herein as the "light fast pigments" demonstrate good color, migration resistance, heat stability, water insolubility, friability and resistance to plateout. The light fast pigments of the present invention have several embodiments, the polyamide embodiment, polyamide ester embodiment and the polyester embodiment. The pigments of the present invention comprises a polymer which comprises polymerized units of fluorescent dye and polymerized monomers such as for example dicarboxylicacids, polycarboxylicacids, diamines, polyamines, alkanolamines, carboxyalcohols, carboxyamines and difunctional alcohols, and/or polyhydric alcohols. The polyamide pigment embodiment and polyamide-ester pigment embodiment are polymers which comprise polyamide linkages. The polyester pigment embodiment are polymers that comprise polyester linkages, but substantially lacks polyamide linkages. The light fast pigments of the present invention contain a fluorescent dye reacted into, and covalently bound to the polymer backbone; this distinguishes the light fast pigment from conventional pigments which typically exist as a solid state solution of fluorescent dye and polymer carrier. In the polyester pigment embodiment, the fluorescent dye, which is physically incorporated into the backbone of polymer chain, is the BXDA fluorescent dye or an analog thereof. In the polyamide pigment and polyamide-ester pigment embodiments, the fluorescent dye is the BXDA fluorescent dye or its analogs thereof, or certain conventional dyes. While the light fast pigment of the present invention demonstrate improved lightfastness, the addition of an optional light stabilizer enhances the lightfastness of the pigment. The invention also relates to a method of making such light fast pigment.

45 Claims, No Drawings

FLUORESCENT POLYMERIC PIGMENTS

BACKGROUND OF THE INVENTION

Objects which exhibit intensely fluorescent color in daylight, or when exposed to a beam of light at night are particularly useful as not only as markers, signs, and other informative and safety oriented devices, but as decorative features. Over time, however, fluorescent colored objects and objects coated with materials such as fluoresent paint, may lose their fluorescent coloration fading This effect is caused by exposure to the elements, particularly sunlight. For objects that are located outdoors for a period of time, lightfastness of the fluorescent color may determine the useful life of the object.

In addition to lightfastness, a fluorescent pigment should exhibit good color, heat stability, and friability. The fluorescent pigment should also be capable of being mixed with either the material of the object that is to be colored, or be mixed in paint or ink. Since the fluorescent dyes themselves are not generally capable of mixing with the material of the object, they are typically combined with resins or other polymeric products to provide a pigment. In conventional fluorescent pigments, the polymer component of the pigment typically acts as a carrier or solvent for the dye; the polymer and the dye associate in a "solid state solution". The conventional fluorescent dye carriers have varied compositions which are selected depending upon the dye and the use of the pigment. The use of certain polyamide polymers and polyamide-polyester copolymers as carriers for fluorescent dye have been described previously; however the polymers are first formed and then the fluorescent dye is added, to form a solid state solution of dye and polymer. While such light fast pigments are useful, upon exposure to ultra-violet light, the lightfastness of the pigments is limited.

Furthermore, where the pigment is to be used in molded plastics, resistance to plate out is desired.

It would be desirable to have a fluorescent pigment having good color, heat stability, friability, which is suitable for coloring a variety of materials, that demonstrates improved lightfastness.

SUMMARY OF THE INVENTION

The present invention provides thermoplastic, preferably non-water soluble, fluorescent pigments having improved lightfastness which are suitable for coloring a variety of materials including plastics, particularly polyolefins, as well as paints, inks and textiles. The pigments of the present invention referred to herein as the "light fast pigments" demonstrate good color, migration resistance, heat stability, water insolubility, friability and resistance to plateout. The light fast pigments of the present invention have several embodiments, the polyamide embodiment, polyamide ester embodiment and the polyester embodiment. The pigments of the present invention comprises a polymer which comprises polymerized units of fluorescent dye and polymerized monomers such as for example dicarboxylicacids, polycarboxylicacids, diamines, polyamines, alkanolamines, carboxyalcohols, carboxyamines and difunctional alcohols, and/or polyhydric alcohols. The polyamide pigment embodiment and polyamide-ester pigment embodiment are polymers which comprise polyamide linkages. The polyester pigment embodiment are polymers that comprise polyester linkages, but substantially lacks polyamide linkages. The light fast pigments of the present invention contain a fluorescent dye reacted into, and covalently bound to the polymer backbone; this distinguishes the light fast pigment from conventional pigments which typically exist as a solid state solution of fluorescent dye and polymer carrier. In the polyester pigment embodiment, the fluorescent dye, which is physically incorporated into the backbone of polymer chain, is the BXDA fluorescent dye or an analog thereof. In the polyamide pigment and polyamide-ester pigment embodiments, the fluorescent dye is the BXDA fluorescent dye or its analogs thereof, or certain conventional dyes. While the light fast pigment of the present invention demonstrate improved lightfastness, the addition of an optional light stabilizer enhances the lightfastness of the pigment. The invention also relates to a method of making such light fast pigment.

DETAILED DESCRIPTION OF THE INVENTION

The light fast pigment of the present invention comprise polymers that comprise polymerized units of fluorescent dye; the fluorescent dye is incorporated into the backbone of the polymer chain by covalent bonding. Since the fluorescent dye is actually incorporated into the backbone, it is technically a monomer; however for clarity, as used herein, the term "monomer" means a monomer, other than the fluorescent dye, which polymerizes to form the polymeric pigment. As used herein, the term "monomer" includes units such as dimers, trimers, and other oligomers.

The polyamide and polyamide-ester pigment embodiment comprise polymers that comprise amide linkages; an amide linkage is formed from the condensation reaction between a carboxylic acid group on one monomer molecule and an amine group on an adjacent monomer molecule. The monomers used to form the amide linkages may contain, on a single monomer molecule, both a carboxylic acid group and an amine group; or the monomers may contain an amine group on one monomer molecule and a carboxylic acid group on another monomer molecule. Ester linkages are formed by the condensation reaction between a carboxylic acid group on one monomer molecule and an alcohol group on an adjacent monomer molecule. Where the pigment contains both ester and amide linkages it is referred to herein as a "polyamide-ester pigment." Where the pigment contains ester linkages but no amide linkages then it is referred to herein as a "polyester pigment." Where the pigment contains amide linkages but no ester linkages than it is referred to herein as a "polyamide pigment."

Monomers used as a source of amine groups to form the amide linkages include: diamines, polyfunctional amines, carboxy-amines, and alkanolamines. The monomers used to form the polymeric pigment of the present invention each contain at least two functional groups. The functional groups may be the same or different. However, all light fast pigments of the present invention contain a first monomer having at least one carboxylic acid group and where such first monomer lacks an alcohol or amine group, then such polymer pigment contains a second monomer containing at least one amine group or at least one alcohol group. Monomers used as a source of carboxy groups used to create the amide linkages and the ester linkages include dicarboxylic acids, polyfunctional carboxylic acids, carboxy-alcohols, carboxyamines. Monomers used as a source of alcohol groups used to create the ester linkages include alkanolamines, carboxy-alcohols, difunctional alcohols, and polyfunctional alcohols.

The Monomers

The monomers used to form the polymeric pigment of the present invention each contain at least two functional groups. The functional groups are amine groups, alcohol groups and carboxylic acid groups. In the polyamide pigment embodiment at least one type of monomer contains an amine group and at least one monomer contains a carboxyl group; the monomers can have both the amino group and the carboxyl group on a single monomer. In the polyamide ester pigment embodiment, at least one type of monomer contains an amine group and at least one monomer contains a carboxylic acid group and at least one monomer contains an alcohol group. The alcohol group, the carboxyl group and the amine group can be present on the same monomer or on different monomers. The polyester pigment embodiment contains polymerized monomer in which at least one type of monomer had a carboxyl group and at least one monomer had an alcohol group; the alcohol group and the carboxyl group can be present on the same monomer, or different monomers.

The Diamine Monomers

The diamine monomers are the preferred monomer for the source of amine groups. The diamine monomers have the general formula:

$H_2N-R-NH_2$ wherein R is a straight or branched chain alkylene group of from 2 to 20 carbon atoms, or a cycloalkylene group from 5 to 8 preferably of from 5 to 6 carbon atoms or a cyclo alkylene group with straight or branched alkyl amino groups additionally having up to three ring substitutions which may be the same or different, such substitution groups selected from the group consisting of $C_1$–$C_5$ alkyl groups.

Representative diamine monomers include ethylenediamine, 1-amino-3-aminomethyl-3,5,5-trimethyl cyclohexane, (also referred to herein as isophoronediamine), hexamethylenediamine, 1,12-dodecanediamine, 2-methylpentamethylenediamine, 2-ethyltetramethylenediamine, 1,2-diaminocyclohexane, 1,3-diaminocyclohexane, cis 1,4-diaminocyclohexane, and trans 1,4-diaminocyclohexane. The isophoronediamine and 2-methylpentamethylenediamine are preferred. Mixtures of diamine monomers may be used.

The Polyamine Monomers

The polyamine monomers typically have the same general structure as the diamine monomers, but contain at least one additional amine group. Mixtures of polyamines may be used.

The Carboxy-Amine Monomers

The carboxyamine monomers contain at least one amine group and at least one carboxylic acid group. Carboxyamine monomers include p-aminobenzoic acid, and lactones, such as caprolactone. Mixtures of carboxy amine monomers may be used.

The Alkanolamine Monomers

The alkanolamine monomers have the general formula:

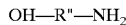

OH—R"—$NH_2$ wherein R" is a straight or branched chain alklyene group having 2 to 8 carbon atoms. Representative alkanolamine monomers include ethanolamine, butanolamine, n-propanolamine, and isopropanolamine. Monoethanolamine and monoisopropanolamine are preferred. Mixtures of alkanolamine monomers may be used.

The Polyfunctional Alkanolamine Monomers

The polyfunctional alkanolamine monomers have the same general structure as the alkanolamine monomers, but contain at least one additional functional group such as an amine group or alcohol group or carboxylic acid group. Mixtures of alkanolamine monomers may be used.

The Dicarboxylic Acid Monomers

The dicarboxylic acid monomers are the preferred monomer for the source of carboxy groups. The dicarboxylic acid monomer is a dicarboxylic acid or its ester or anhydride derivative of the general formula:

HOOC—R'"—COOH wherein R' is: a straight or branched chain alkylene group of from 3 to 20 carbon atoms; a cycloalkylene group of from 5 to 8 carbon atoms, or a cycloalkylene group with straight chain or branched alkyl carboxy groups optionally having up to three ring substitutions, which may be the same or different, such substitution groups selected from the group consisting of $C_1$–$C_5$ alkyl groups; a mono-cyclic or bicyclic arylene group of from 6 to 10 carbon atoms optionally having up to six ring substitutions which may be the same or different, selected from the group consisting of $C_1$–$C_5$ alkyl groups; or a $C_1$–$C_2$ dialkyl ester or an anhydride of the diacid formed by said monocyclic or bicyclic arylene group.

Representative dicarboxylic acid monomers or ester or anhydride derivatives include phthalic acid/phthalic anhydride, isophthalic acid, terephthalic acid, 2,6-naphthalene dicarboxylic acid, succinic acid/succinic anhydride, glutaric acid, adipic acid, azelaic acid, sebacic acid, decanedioic acid, dodecanedioic acid, mixtures of succinic, glutaric and adipic acids, cyclohexane dicarboxylic acid, dimethylisophthalate, dimethylphthalate, dimethylterephthalate, dimethyl 2,6-naphthalene dicarboxylate, dimethyladipate, dimethylglutarate, and dimethylsuccinate. Phthalic acid, isophthalic acid and terephthalic acid are preferred. Mixtures of dicarboxylic acid monomers may be used.

The Polyfunctional Carboxylic Acid Monomers

The polyfunctional carboxylic acid monomers have the same general structure as the dicarboxylic acid monomers, but contain at least one additional carboxylic acid group. Mixtures of polyfunctional carboxylic acid monomers may be used.

The Difunctional Alcohol Monomers

The difunctional alcohol monomers have the general formula:

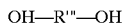

OH—R'"—OH wherein R'" is: a straight or branched chain alkylene group having 2 to 20 carbon atoms; a cycloalkylene group having 5 to 8 carbon atoms or a cycloalkylene group with straight chain or branched alkyl alcohol groups and optionally having up to three ring substitutions, which may be the same or different, said ring substitution groups containing alkyl groups having 1 to 5 carbon atoms. Representative difunctional alcohol monomers include: cyclohexandimethanol, ethylene glycol, propylene glycol. Mixtures of difunctional alcohol monomers may be used. The difunctional alcohol monomer is present from 0% to about 49%, preferably from about 0.1% to about 49%, more preferably from 5% to 40%, of the pigment weight.

The Polyfunctional Alcohol Monomers

The polyfunctional alcohol monomers have the same general structure as the difunctional alcohol monomers, but contain at least one additional alcohol group. Mixtures of polyfunctional alcohol monomers may be used. Illustrative polyhydric alcohol monomers include trimethylolpropane, pentaerythritol available from Celanese, and dipentaerythritol.

The Carboxy-Alcohol Monomers

The carboxy-alcohol monomers contain at least one amine group and at least one alcohol. The carboxy-alcohol monomers include p-hydroxybenzoic acid, 2-chloro-4-hydroxybenzoic acid and salicyslic acid.

The ratio of carboxylic acid groups to amine groups is preferably 0.75:1 to 1.5:1, more preferably 0.95:1 to 1:1 for polyamide polymers. The ratio of carboxylic acid groups to amine and alcohol groups is preferably 0.75:1 to 1.5:1, more preferably 0.95:1 to 1:1 for polyamide-ester polymers. The ratio of carboxylic acid groups to alcohol groups is preferably 0.75:1 to 1.5:1, more preferably 0.95:1 to 1:1 for polyester pigments.

The Fluorescent Dye

The fluorescent dyes which are incorporated into the backbone of the polymer chain, include both certain conventional fluorescent organic dyes, and benzoxanthene dyes as well as 1H,3H-Z-benzopyrano[6,5,4-mna]xanthene-1,3-dione, designated herein as "BXDA" which was not previously known to be a fluorescent dye. BXDA, also known as 3,4-benzoxanthenedicarboxylic anhydride, is a non-water soluble fluorescent dye having the following forms:

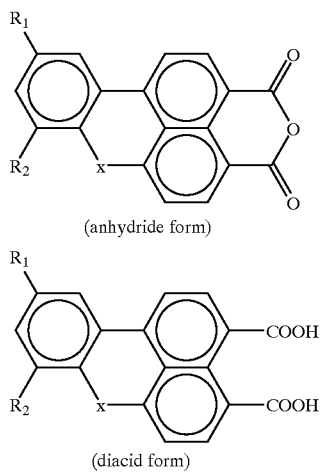

(anhydride form)

(diacid form)

wherein:
x is oxygen or sulfur;
R$_1$ is: hydrogen; a halogen, preferably chlorine or bromine; an alkyl group having 1 to 6, preferably 4, carbon atoms; an alkoxy group having 1 to 6, preferably 4, carbon atoms; or a carboalkoxy group having 1 to 6, preferably 4, carbon atoms;
R$_2$ is: hydrogen; an alkyl group having 1 to 6, preferably 4, carbon atoms; or an alkoxy group having 1 to 6, preferably 4, carbon atoms.

In the preferred BXDA dye, which typically produces a fluorescent yellow color, X is oxygen, R$_1$ is hydrogen and R$_2$ is hydrogen, and the dye is of the anhydride form; this molecule, 1-H,3-H-Z-benzopyrano[6,5,4-mna]xanthene-1, 3-dione, was not previously known to be a fluorescent dye.

The conventional fluorescent dyes which are incorporated into the backbone of the polymer chain, are those dyes which posses at least one reactive group capable of reacting with the monomers so as to be incorporated into the backbone of the polymer chain. Such dyes include, for example, conventional benzoxanthenes, benzothioxanthene, benzoxanthene dicarboxylic anhydride, and benzothioxanthene dicarboxylic anhydride.

The fluorescent dye comprises from about 0.05 to about 15%, preferably about 0.5 to about 10% of the total weight of the pigment.

The pigment of the present invention, in which fluorescent dye has been incorporated into the backbone of the polymer chain, may be combined with conventional dye that is not incorporated into the backbone, to provide the pigment with a different, modified color.

Optional Ingredients

The Light Stabilizer

While optional, it is preferred that a light stabilizer be combined with the pigment. The light stabilizer may be added to the pigment or it may be added to the material to be colored, before or after the pigment is added. Suitable light stabilizers are conventional, and include, for example, benzotriazols; hindered amines; benzophenones; and metal organic complexes, and mixtures thereof. A preferred hindered amine light stabilizer is commercially available as "Tinuvin 770" from Ciba-Geigy.

Light stabilizers may also be purchased already added to plastic; suitable products of this type are polypropylenes available as "Stamylin", from DSM Company, and "Kelbron," which contain a proprietary light stabilizer. Light stabilizer is added to pigment from 0 to 5%, preferably from about 0.1% to about 5%, more preferably about 0.1% to about 2% of pigment weight.

Modifiers

Optionally, the fluorescent pigments of the present invention may be altered by including modifiers which react with the monomers during the formation of the polymer. Typically, modifiers are included to increase the molecular weight by chain extension, alter the softening or melting point, provide enhanced compatibility for particular plastics to be colored, or otherwise complement or enhance the suitability of the pigment for a particular application. Preferred modifiers include monofunctional acids, monofunctional amines, monofunctional alcohols, epoxies, metal oxides, metal carbonates and metal acetates. Illustrative monofunctional acids, include for example, benzoic acid, p-tertbutylbenzoic acid, stearic acid, lauric acid, pelargonic acid, palmitic acid, and cyclohexanecarboxylic acid. Illustrative monofunctional amines include, for example, n-nonylamine, isononylamine, stearylamine, cyclohexylamine and benzylamine. Illustrative monofunctional alcohols include for example, stearyl alcohol, cetyl alcohol, n-nonyl alcohol, benzyl alcohol, monofunctional aliphatic alcohols having a weight-average molecular weight in the range of from 400 to 700, such as an alcohol having 30–50 carbon atoms and an average molecular weight of 425, available as Unilin 425 from Petrolite, tridecyl alcohol, n-decyl alcohol, cyclohexanol, 2-ethylhexanol and cyclododecanol. Illustrative epoxies include bisphenol A epoxies and aliphatic epoxies.

The amount of modifier used should not adversely affect the basic novel properties of the fluorescent compositions. Typically, the amount of the reactive modifier, when employed, will range from about 1% to about 20% based on the total weight of the pigment.

Additives

Conventional additives such as opacifiers, antioxidants and processing acids are optionally added to the fluorescent pigments. Phosphorous acid is optionally added as an antioxidant or stabilizer. Defoamers, such as silicone type foam stabilizer, available as Nalco 2300, from Nalco Chemical Co. or Hodag PV 48-R, from Hodag Company, are optionally used.

The additives may be added prior to, during, or after the condensation reaction is completed.

Preparation of the Pigment

Preparation of the BXDA Dye

The BXDA fluorescent dye is prepared according to the method described in U.S. Pat. No. 3,741,971, to Fuchs O. et.

al. issued Jun. 26, 1973. The structure of the BXDA dye used in the present invention is shown as structures 5 and 6, column 2, lines 50–60 as an intermediate compound formed in the synthesis of another dye, as disclosed in U.S. Pat. No. 3,741,971. The synthesis disclosed in U.S. Pat. No. 3,741,971, is terminated at the anyhdride form.

Preparation of the Polymer

Polymers are prepared by charging the monomers and fluorescent dyes into a vessel equipped with a means of heating, mechanical stirring, and a condenser to remove the water of reaction. Alternatively, the monomers are charged and the dye added later, however the polymerization reaction must not be completed, so as to permit incorporation of the dye into the backbone of the polymer chain. Both methods produce a pigment containing the dye incorporated into the backbone of the polymer chain.

The polymer formulations preferably contain 0.5–1.2 equivalents, more preferably 0.75–1.1 equivalents of amine per equivalent of carboxylic acid for the polyamide embodiment and the polyamide-ester embodiment. The polymer formulations preferably contain from about 0.05% to about 20%, more preferably from about 0.5 to about 10% BXDA. The amine or alcohol equivalents are equal to or greater than the equivalents of dye being utilized.

The light fast pigments are substantially linear and have a weight-average molecular weight in the range of from about 500 to about 100,000, preferably, from about 700 to about 20,000, more preferably from about 1,000 to about 10,000. Reaction terminators are optional. The molecular weight may be controlled by regulation of the reaction time and temperature. The reactive group on the fluorescent dye reacts with the functional groups on the monomers. In the preferred polyamide and polyamide-ester embodiments, the carboxylic acid group of the dye molecule, including the BXDA dye molecule reacts with the amino groups present on monomers. If monomers containing alcohol group are present, the carboxylic groups on the BXDA dye molecules react with alcohol groups on the monomers. As a result, the dye molecule is incorporated into the backbone of the polymer chain as it is formed.

The light fast pigments of the present invention are prepared by condensation polymerization reactions illustrated by the following examples. After the pigment is formed, the cooled resin is typically ground to the desirable particle size. The resin has been found to be friable and easily ground to the typical particle size as small as 0.5 microns, although it is typically ground to a size of from about 2 to about 10 microns. Grinding is done in a conventional manner.

Thereafter, the light fast pigments are typically mixed in either plastic, or paint, as desired. Typically, injection grade or extrusion grad Polyethylene or polypropylene were used such as: Kelburon, a modified propylene elastomer polymer from DSM Holland; Statoil 211038, a modified propylene elastomer polymer from State Oil Company, Sweden; Stamylin, a modified propylene polymer; or polypropylene 4240, from Eastman Kodak Company. The plastic containing the pigment was then injected molded, typically in a Newbury injection molder at 450° C. to provide a molded plastic article.

In the examples and throughout the specification all parts and percentages are by weight unless otherwise indicated. The reactor used was a conventional stainless steel or glass resin reactor.

The Polyamide Polymers and the Polyamide Ester Polymers

EXAMPLE 1

A reaction vessel equipped as described above was charged with 52.9 parts of 2-methylpentamethylenediamine, 109.4 parts cyclohexanedimethanol, 189 parts of isophthalic acid, 5.25 parts of the alcohol modifier, Unilin, and 7.0 parts of the BXDA dye, to provide a dye concentration of 2% pigment weight. The mixture was raised to a temperature of 220° C. and maintained at that temperature for 120 minutes. The resin was cooled to room temperature, ground and added to Statoil 211038, to provide a final concentration of 4% total plastic weight.

EXAMPLE 2

A pigment was prepared as in example 5, except that 14.0 parts of the dye was added, to provide a dye concentration of 4% total pigment weight. The pigment was then added to Statoil 211038, to provide a final pigment concentration of 4% total plastic weight.

EXAMPLE 3

A pigment was prepared as in example 7, and then added to Kelbron, to provide a final pigment concentration of 4% total plastic weight.

EXAMPLE 4

A pigment was prepared by charging 78.9 parts cyclohexanedimethanol, 74.7 parts monoisopropanolamine, 0.6 parts of the silicone foam defoamer, Nalco 2300, 247.85 parts isophthalic acid, 3.5 part phosphorous acid and 7.0 parts BXDA dye, into a reactor, heating the mixture to 210° C. for 3 hours, then dumping. The pigment was then added to paint formulation.

EXAMPLE 5

A reaction vessel equipped as described above was charged with 55.5 parts monoethanolamine, 40.5 parts ethylenediamine, 15.1 parts pentaerythritol, 55.5 parts of benzoic acid, 250.2 parts of isophthalic acid, 2.1 parts 70% $H_3PO4$, and 7.0 parts of BXDA dye. The mixture was raised to a temperature of 220° C. and maintained for 120 minutes. The resin was then dumped and ground.

EXAMPLE 6

A reaction vessel equipped as described above was charged with 121 g. of 2-methylpentamethylenediamine, 250 g. cyclohexanedimethanol, 432 g. of isophthalic acid, 12 g of the alcohol modifier, Unilin 425 and 16 g. of the BXDA dye, to provide a dye concentration of 2% total pigment weight. The mixture was raised to a temperature of 220° C. and maintained at that temperature for 120 minutes. The resin was cooled to room temperature and ground, and added to polypropylene 4240.

EXAMPLE 7

A pigment was prepared as in Example 12, except that the 4% pigment, and 1% Tinuvin 770, light stabilizer, was added to polypropylene 4240.

EXAMPLE 8

A pigment was prepared as in Example 12 except that the 4% pigment, and 0.5% Tinuvin 770, light stabilizer, was added to polypropylene 4240.

EXAMPLE 9

A pigment was prepared as in Example 12, except that the pigment was added to Kelburon to provide a final concentration of 4% total plastic weight.

EXAMPLE 10

A pigment was prepared as in Example 12, except that 4% pigment was added to Stamylin 83MF 10.

EXAMPLE 11

A pigment was prepared as in Example 12, except that 4% pigment was added to Stamylin 83MF 90.

EXAMPLE 12

A pigment was prepared as in Example 12, except that 4% pigment was added to Stamylin 83MF 94.

EXAMPLE 13

A pigment was prepared as in Example 12, except that 4% pigment was added to Stamylin 83MF 97.

EXAMPLE 14

A pigment was formed by charging two 23.1 parts water, 0.07 parts of silicone de-foamer, Nalco 2300, 135.29 parts isophrone diamine, 39.3 cyclohexylamine, 75.13 parts azelaic acid, 131.99 parts isophthalic acid and 7 parts BXDA dye. The mixture was heated to 260° C., cooled to 230° C. in about 1.5 hours and dumped. Another example of pigment is one which comprises the same above ingredients except that cyclohexylamine is replaced with cyclohexanedimethanol.

EXAMPLE 15

A pigment was prepared by charging the reactor with 1.04 parts zinc oxide, 0.06 parts silicone foam stabilizer, Nalco 2300, 24.79 parts water, 99.98 parts isophrone diamine, 25.97 parts cyclohexylamine, 22.78 parts pentaerythritol, 75.55 parts stearic acid, 153.46 parts isophthalic acid, 7.0 parts BXDA, and 0.41 phosphorous acid. The mixture was heated to 260° C. in about 1.5 hours, cooled to 230° C. for in about 1.5 hours and then dumped.

EXAMPLE 16

A pigment was prepared by charging 81.1 parts cyclohexane dimethanol, 75.9 parts mono-isoproponolamine, 251.7 parts isophthalic acid, 0.06 parts Nalco 2300 defoamer, 3.5 parts phosphoric acid and 7.4 parts BXDA into a reactor. The mixture was heated for about 2 hours at 220° C., and then dumped.

EXAMPLE 17

A pigment was prepared as in Example 26 except 3.5 parts Tinuvin 770 was also added to the charge.

EXAMPLE 18

A pigment was prepared by charging 162.2 parts cyclohexanedimethanol, 151.8 parts monoisopropanolamine, 503.4 parts isophthalic acid, 0.12 parts Nalco 2200, 7.0 parts 70% phosphoric acid, and 14.5 parts BXDA dye to the reactor. The mixture was heated for 2 hours at 220° C. The mixture was then cooled for 10 minutes then dumped.

Polyester Pigments Embodiment

EXAMPLE 19

A pigment was prepared by charging a reactor with 244.88 g. cyclohexanedimethanol (90%), 13.63 g. trimethylolpropane, 55.87 g. isophthalic acid, 172.63 g. terephthalic acid, 10 g. Unilin 425, 4 g. FASAT 4101 a dibutyl tin laurate esterification catalyst, from Elf Atochem and 4 g. of silicone foam stabilizer Nalco 2300. The mixture was then heated to 240° C. for one hour and 8 g. of the BXDA was added. Then the batch was heated to about 240° C. for about 30 minutes. Next, the mixture was cooled and ground.

EXAMPLE 19A

A pigment was made as in the previous example except that 8 g. of BXDA was added when the other reagents were charged in the reactor. Another example of pigment is one which comprises the above ingredients except that terephthalic acid is not included.

EXAMPLE 20

A pigment was prepared by charging the reactor with 177.48 g. cyclohexanedimethanol (90%), 47.4 g. trimethylolpropane, 301.08 g. dimethylterephthalate, 2.8 FASCAT 4102 a dibutyl tin laurate esterification catalyst, from Elf atochem, 0.8 g. defoamer Nalco 2341. The mixture was then heated to about 240° C. for four hours. Then 8 g. BXDA was added. Next, the mixture was cooled and ground.

EXAMPLE 20A

A pigment was prepared as in the previous example except that the 8 g. of BXDA were charged in the reactor along with the other reagents.

EXAMPLE 21

A reaction vessel equipped as above was charged with 91.1 parts isophrone diamine, 88.8 parts cyclohexane dimethanol, 8.0 parts BXDA, 1.5 parts of a 70% solution of phosphorous acid in water and 114 parts of isophthalic acid. The batch was heated to 230° C., then 120 parts of polyethylene terephthalate was added in three equal aliquats. The batch was heated to 250° C. over about one hour and then an additional 64 parts of isophthalic acid was added. The batch was maintained at 230° C. for 120 minutes, then the product was dumped and cooled to room temperature. The solid mass was reduced in particle size by mechanical grinding. Other examples of fluorescent pigments are pigments which comprise the fluorescent dye, isophthalic acid, trimethylolpropane and cyclohexanedimethanol.

COMPARATIVE EXAMPLES

Comparative Example A

A pigment containing a conventional coumarin dye was made by mixing a coumarin with an ester-amide polymer carrier to provide a solid state solution of dye and polymer, in which the dye was not incorporated into the backbone of the polymer chain. After the polyamide polymer was formed, the mixture was cooled and the coumarin dye was added. The mixture was cooled to room temperature and ground to yield a pigment that is a solid state solution of a fluorescent dye and a polyamide-ester polymer. The pigment was then added to polypropylene 4240G.

Comparative Example B

A pigment containing a conventional fluorescent dye, Golden Yellow a 2H,13H-3-phenylpyrazolol-1,5-B (thioxantheno)-2,1,10-D,E, F(isoquinoline)-2,13-dione was added to the polyamide carrier to provide a solid state solution of dye and polymer; the dye was not incorporated into the backbone of the polymer. The pigment was then added to polypropylene, which contains proprietary light stabilizer.

Comparative Example C

A pigment containing the BXDA dye was mixed with paraformaldehyde and toluene sulphonamide to provide a solid state solution of a sulphonamide melamine resin and dye. The paraformaldehyde and the toluene sulphonamide do not have groups that react with the novel BXDA dye, thus the dye is not incorporated into the backbone of the polymer chain. The pigment was then added to paint formulation.

Comparative Example D

A pigment was prepared as in Example C except a conventional coumarin dye was added rather than the BXDA dye to provide a solid state solution of coumarin dye and sulphonamide melamine resin. Since neither the paraformaldehyde, toluene sulphonamide, nor the coumarin have groups that react with each other, the coumarin dye is not incorporated into the backbone of the polymer chain. The pigment was then added to paint formulation for evaluation.

Comparative Example E

A pigment was prepared as in Example A, and added to propylene which contained the light stabilizer Tinuvin 770.

Pigment Evaluation

The pigment of the above Examples 1, 2, 3, 6, and 7–15 were dry blended with pelletized plastic using mineral oil as wetting agent and shaken, then molded. The molded samples were evaluated for lightfastness, were physically masked over about half of the surface of the plastic article to prevent exposure to light. The article was then placed either: outdoors at a 45° angle Cleveland South; or in a fadometer at 0.35 w/m², 500 relative humidity and 65° C. black panel temperature; for a duration as noted in Table I. The plastic samples were removed and were evaluated by visual inspection. The results are presented in Table I.

TABLE I

EVALUATION OF FADE RESISTANCE OF PIGMENT IN PLASTIC
DETERMINED BY VISUAL INSPECTION

| EX. | DYE | PIGMENT | PLASTIC | LIGHT STABIZER | EXPOSURE METHOD | DURATION (HOURS UNLESS OTHERWISE NOTED) | RESULT |
|---|---|---|---|---|---|---|---|
| pigments | | | | | | | |
| 1 | BXDA | N | S | Y | F | 757 | excellent |
| 1 | BXDA | N | S | Y | F | 1757 | good |
| 1 | BXDA | N | S | Y | O | 4 mo. | Excellent |
| 2 | BXDA | N | S | Y | F | 757 | excellent |
| 2 | BXDA | N | S | — | F | 1757 | good |
| 2 | BXDA | N | S | — | O | 4 mo. | Excellent |
| 3 | BXDA | N | K | — | F | 1240 | excellent |
| 6 | BXDA | N | E | No | F | 2000 | fair |
| 7 | BXDA | N | E | T 1% | F | 2000 | excellent |
| 8 | BXDA | N | E | T .5% | F | 2000 | good |
| 9 | BXDA | N | K | —yes | F | 2000 | excellent |
| 10 | BXDA | N | SM | T small amount | F | 2000 | poor |
| 11 | BXDA | N | SM | T moderate | F | 2000 | fair |
| 12 | BXDA | N | SM | T high | F | 2000 | good |
| 13 | BXDA | N | SM | T highest | F | 2000 | excellent |
| 14 | BXDA | N | K | Y | F | 2000 | good |
| 15 | BXDA | N | K | Y | F | 2000 | good |
| comparative examples | | | | | | | |
| A | coum | C | E | — | O | 3.5 mo. | faded to white |
| B | BTXDA | C | E | none | F | 100 | poor |
| E | coum | C | E | T | O | 3.5 mo. | faded to white |

F - Fadometer.
O - Outdoors:
coum - coumarin
SMF - sulphonamide melamine formaldehyde resin
T - Tinuvin
Y - proprietary light stabilizer present in plastic when purchased

TABLE I-continued

EVALUATION OF FADE RESISTANCE OF PIGMENT IN PLASTIC DETERMINED BY VISUAL INSPECTION

| EX. | DYE | PIG-MENT | PLASTIC | LIGHT STABIZER | EXPOSURE METHOD | DURATION (HOURS UNLESS OTHERWISE NOTED) | RESULT |
|---|---|---|---|---|---|---|---| mo. - months
N - pigment contains polymerized units of dye
C - solid state solution of polymer carrier and dye
K - Kelbron
S - Statoil
E - Eastman Kodak polypropylene 4240
SM - Stamylin Those light fast pigments of Examples 4 and 5 which were mixed in paint, without light stabilizer, then painted onto penopac sag and leveling test charts and placed in a CI-35I fadometer from Atlas at an exposure dose of 0.35 W/cm$^2$, 50% relative humidity and 65° C. black panel temperature, for duration as noted in Table II. The paint samples were removed and were evaluated by visual inspection. The results are presented in Table II.

TABLE II

EVALUATION OF FADE RESISTANCE OF PIGMENT IN PAINT

| EX. | DYE | PIG-MENT | LIGHT STAB. | DURATION (HOURS UNLESS OTHERWISE NOTED) | CON-DITION |
|---|---|---|---|---|---|
| pigments | | | | | |
| 4 | BXDA | N | — | 48 | excellent |
| 4 | BXDA | N | — | 170 | excellent |
| 5 | BXDA | N | — | 48 | good |
| 5 | BXDA | N | — | 170 | very good |
| comparative examples | | | | | |
| C | BXDA | SMF | — | 48 | excellent |
| C | BXDA | SMF | — | 170 | poor |
| D | coumarin | SMF | — | 48 | good |
| D | coumarin | SMF | — | 170 | poor |

SMF - sulphonamide melamine formaldehyde resin
N - pigment contains polymerized units of dye The pigments of Examples 1, 2 and 3 were subjected to fluorescent spectrophotometry using an F-4500 fluorescence spectrophotometer manufactured by Hitachi Instruments, Inc. The Hitachi Instrument uses a 150 watt xenon lamp and a R3788 photomultiplier detector at 1.0 nm resolution, with an excitation bandpass at 1, 2.5, 5 and 10 nm and an emission bandpass at 1, 1.5, 10 and 20 nm. The results are presented in Table III.

TABLE III

FLUORESCENT SPECTRATROPHOTOMETRIC EVALUATION OF PIGMENTS

| | | | | | CONDITION | | |
|---|---|---|---|---|---|---|---|
| EX. | DYE | PIGMENT | PLASTIC | EXPOSURE METHOD | DURATION | $\lambda$max | Peak Hgt. |
| Pigment examples | | | | | | | |
| 1 | BXDA | N | S | F | unexposed | 512.0 | 703.7 |
| 1 | BXDA | N | S | F | 757 h. | 510.4 | 201.2 |
| 1 | BXDA | N | S | F | 1757 h. | 512 | 94.07 |
| 1 | BXDA | N | S | O | unexposed | 512 | 751.2 |
| 1 | BXDA | N | S | O | 4 mo. | 513 | 549.3 |
| 2 | BXDA | N | S | F | unexposed | 507 | 865.9 |
| 2 | BXDA | N | S | F | 757 h. | 508.8 | 218.1 |
| 2 | BXDA | N | S | F | 1757 h. | 508.0 | 129.7 |
| 2 | BXDA | N | S | O | unexposed | 508.8 | 770.5 |
| 2 | BXDA | N | S | O | 4 mo. | 508.8 | 416.7 |
| 3 | BXDA | N | K | F | unexposed | 510.4 | 564.0 |
| 3 | BXDA | N | K | F | 1240 h. | 508.8 | 175.8 |

TABLE III-continued

FLUORESCENT SPECTRATROPHOTOMETRIC EVALUATION OF PIGMENTS

|  |  |  |  |  | CONDITION | | |
|---|---|---|---|---|---|---|---|
| EX. | DYE | PIGMENT | PLASTIC | EXPOSURE METHOD | DURATION | λmax | Peak Hgt. |
|  |  |  | comparative example |  |  |  |  |
| B | BTXDA | C | E | F | unexposed | 527.4 | 222.2 |
| B | BTXDA | C | E | F | 100 h. | 532.2 | 33.8* |
| B | BTXDA | C | E | F | 150 h. | 527.4 | 52.9 |

*error due to sample position
F - Fadometer
O - Outdoors
Light Stabilizer was contained in Comparative Example B; remaining examples lacked light stabilizer
N - pigment contains polymerized units of dye
C - solid state solution of polymer carrier and dye
K - Kelbron
S - Statoil
E - Eastman Kodak polypropylene 4240
SM - Stamylin As seen from Tables I, II, and III, the light fast pigment having the BXDA dye incorporated in the backbone of the polymer chain, display improved lightfastness as compared to the conventional examples of the comparative examples. The conventional pigments which contain dyes such as coumarin or BTDXA are not incorporated into the backbone of the polymer chain.

The addition of light stabilizer to the pigment of the present invention further improves the lightfastness. The addition of the light stabilizer to conventional pigments of Comparative Examples B, E, and C, does not display the same improved lightfastness. This indicates a synergistic effect between the pigment of the present invention and the light stabilizers.

As shown in Table III, the exposed Examples 1, 2, and 3, which contain the pigment having the BXDA dye incorporated in to the backbone of the polymer chain, demonstrate a improved lightfastness when compared to Comparative Example B. The exposed portions of Comparative Example B faded relative to the unexposed Comparative Example B, as determined by peak height.

The pigment of Examples 16, 17 and 18 which contain the BXDA dye were ground using a laboratory impact grinder and combined with conventional ingredients used to make fluorescent inks to provide a fluorescent ink having 10% pigment. The ink was drawn down onto cotton cloth, dried and placed in the xenon arc fadometer at 0.35 w/m$^2$, 50% relative humidity and 65° C. black panel temperature. A conventional ink containing 5% conventional pigment also was applied to cotton cloth and tested in the same manner. By 50 hours the conventional ink had disappeared, but the ink containing the light fast pigments of Examples 16, 17 and 18 were still vivid. By 160 hours the inks containing the light fast pigments of Examples 16, 17 and 18 were still vivid. At 320 hours, the ink containing the pigment of Example 18 was still excellent. Although certain embodiment of this invention have been shown and described, various adaptations and modifications can be made without departing from the scope of the invention as defined in the appended claims.

What is claimed is:

1. A fluorescent pigment comprising polymerized units of:
   a. fluorescent dye;
   b. a first monomer having at least two functional groups wherein at least one functional group is a carboxyl group; and
   c. a second monomer having at least two functional groups wherein at least one functional group is an amine group;
      wherein the monomer in b and c may be the same molecule if and only if said same molecule has both an amine group and a carboxyl group;
   d. from 0 to about 49% of a third monomer containing at least two functional groups wherein at least one functional group is an alcohol group,
      wherein monomer d may be the same monomer as either b or c or both; and, further wherein the fluorescent pigment is a polyamide or a polyamide-ester.

2. The pigment of claim 1, wherein: the monomers are selected from the group consisting of: diamine monomers, polyfunctional amine monomers, alkanolamine mononers, dicarboxylic acid monomers, polyfunctional carboxylic acid monomers, carboxyl-alcohol monomers, carboxyamine monomers, difunctional alcohol monomers, polyfunctional alcohol monomers, and mixtures thereof.

3. The pigment of claim 2, wherein: the monomers are selected from the group of diamine monomer, alkanolamine monomer, difunctional alcohol monomer, and dicarboxylic monomer, wherein:
   a. the diamine monomer has the formula:

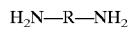

wherein R is selected from the group consisting of: a straight or branched chain alkylene group having from 2 to 20 carbon atoms; or a cycloalkylene group having from 5 to 8 carbon atoms; or a cycloakylene group with straight chain or branched alkyl amino groups; and
   b. alkanolamine monomer has the formula:

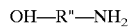

wherein R" is a straight or branched chain alklyene group having 2 to 8 carbon atoms;
   c. the dicarboxylic acid monomer has the formula:

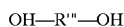

wherein R' is selected from the group consisting of: a straight or branched chain alkylene group having from 3 to 20 carbon atoms; a cycloalkylene group having from 5 to 8 carbon atoms; or a cycloakylene group with straight chain or branched alkyl carboxcylic acid groups; mono-cyclic or bicyclic arylene group having from 6 to 10 carbon atoms optionally having up to six ring substitutions which may be the same and different, selected from the group consisting of $C_1$–$C_5$ alkyl; or a $C_1$–$C_2$ dialkyl ester or an anhydride of the said dicarboxylic acid;

d. the difunctional alcohol monomer has the formula:

OH—R'''—OH wherein R''' is selected from the group consisting of: a straight or branched chain alklyene group having 2 to 20 carbon atoms; a cycloalkylene group having 5 to 8 carbon atoms; or a cycloakylene group with straight chain or branched alkyl alcohol groups.

4. A pigment according to claim 3, wherein:

for the diamine monomer, R is a branched chain alkylene group of from 4 to 16 carbon atoms or a cycloalkylene group with straight chain or branched alkyl amino groups, said cycloalkylene having up to three ring substitutions, which may be the same or different, said ring substitution groups containing alkyl groups having 1 to 5 carbons atoms;

for the dicarboxylic acid monomer R' is a cycloalkylene group having up to three ring substitutions, which may be the same or different, said ring substitution groups containing alkyl groups having 1 to 5 carbon atoms;

for the alkanolamine, R'' is a straight or branched chain alklyene group having 2 to 8 carbon atoms; and for the difunctional alcohol monomer, R'' is a cycloalkylene group having up to three ring substitutions, which may be the same or different, said ring substitution groups containing alkyl groups having 1 to 5 carbons atoms.

5. A pigment according to claim 3, wherein said fluorescent dye has the following structure:

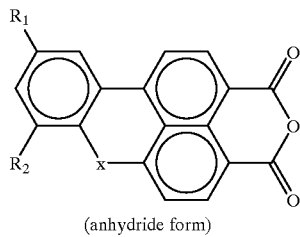

(anhydride form)

or

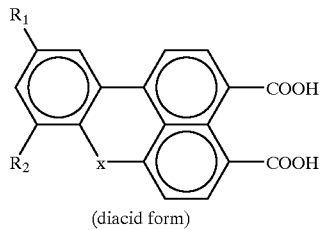

(diacid form)

wherein:

x is selected from the group consisting of: oxygen or sulfur;

$R_1$ is selected from the group consisting of: hydrogen; halogen; an alkyl group having 1 to 6 carbon atoms; an alkoxy group having 1 to 6 carbon atoms; or a carboalkoxy group having 1 to 6 carbon atoms;

$R_2$ is selected from the group consisting of: hydrogen; an alkyl group having 1 to 6 carbon atoms; or an alkoxy group having 1 to 6 carbon atoms.

6. A pigment according to claim 5, wherein x is oxygen, $R_1$ is hydrogen, and $R_2$ is hydrogen.

7. A pigment according to claim 5, wherein the first monomer is isophthalic acid and the second monomer is 2-methylpentamethylenediamine.

8. A pigment according to claim 7, wherein the third monomer is cyclohexanedimethanol.

atoms; or an alkoxy group having 1 to 6 carbon atoms.

9. A pigment according to claim 5, wherein the first monomer is isophthalic acid and azelaic acid and the second monomer is 1-amino-3-aminomethyl-3,5,5-trimethylcyclohexane, and the third monomer is cyclohexanedimethanol.

10. A pigment according to claim 5, wherein the first monomer is isophthalic acid and benzoic acid, the second monomer is ethylenediamine, and the third monomer is monoethanolamine.

11. A pigment according to claim 10, wherein the third monomer further comprises pentaerythritol.

12. A pigment according to claim 5, wherein the first monomer is isophthalic acid, the second monomer is monoisopropylamine, and the third monomer is cyclohexanedimethanol.

13. A pigment according to claim 5, wherein the first monomer is a mixture of azelaic acid and isophthalic acid; and the second monomer is a mixture of isophorone diamine and cyclohexylamine.

14. A pigment according to claim 5, wherein, the first monomer is a mixture of stearic acid and isophthalic acid, the second monomer is isophorone diamine, and the third monomer is pentaerythritol.

15. A pigment according to claim 5, wherein the first monomer is isophthalic acid the second monomer is isophorone diamine, the third monomer is cyclohexanedimethanol, and further comprising and polyethylene terephthalate.

16. A pigment according to claim 3, further comprising a hindered amine light stabilizer.

17. A pigment according to claim 1, wherein said fluorescent dye has the following structure:

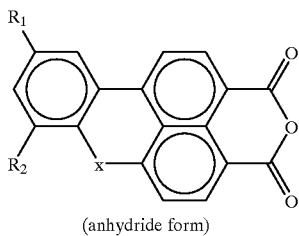

(anhydride form)

-continued or

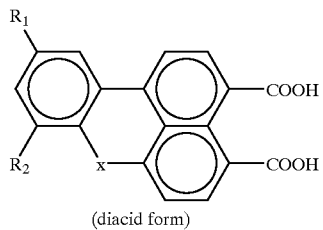

(diacid form)

wherein:
x is selected from the group consisting of: oxygen or sulfur;
$R_1$ is selected from the group consisting of: hydrogen; halogen; an alkyl group having 1 to 6 carbon atoms; an alkoxy group having 1 to 6 carbon atoms; or a carboalkoxy group having 1 to 6 carbon atoms;
$R_2$ is selected from the group consisting of: hydrogen; an alkyl group having 1 to 6 carbon atoms; or an alkoxy group having 1 to 6 carbon atoms.

18. A pigment according to claim 17, wherein x is oxygen, $R_1$ is hydrogen, and $R_2$ is hydrogen.

19. The fluorescent pigment of claim 1, wherein the fluorescent dye has a structure that is in anhydride form or diacid form.

20. The fluorescent pigment of claim 1, wherein the third monomer is present from about 0.1% to about 49% of the pigment weight.

21. The fluorescent pigment of claim 20, wherein the third monomer is present from about 5% to about 40% of the pigment weight.

22. The pigment of claim 20, wherein: the monomers are selected from the group consisting of: diamine monomers, polyfunctional amine monomers, alkanolamine monomers, dicarboxylic acid monomers, polyfunctional carboxylic acid monomers, carboxyl-alcohol monomers, carboxyamine monomers, difunctional alcohol monomers, polyfunctional alcohol monomers, and mixtures thereof.

23. The pigment of claim 22, wherein: the monomers are selected from the group of diamine monomer, alkanolamine monomer, difunctional alcohol monomer, and dicarboxylic monomer, wherein:

a. the diamine monomer has the formula:

$H_2N—R—NH_2$ wherein R is selected from the group consisting of: a straight or branched chain alkylene group having from 2 to 20 carbon atoms; or a cycloalkylene group having from 5 to 8 carbon atoms; or a cycloalkylene group with straight chain or branched alkyl amino groups; and b. alkanolamine monomer has the formula:

$OH—R''—NH_2$ wherein R" is a straight or branched chain alklyene group having 2 to 8 carbon atoms;

c. the dicarboxylic acid monomer has the formula:

$R'(COOH)_2$ wherein R' is selected from the group consisting of: a straight or branched chain alkylene group having from 3 to 20 carbon atoms; a cycloalkylene group having from 5 to 8 carbon atoms; or a cycloalkylene group with straight chain or branched alkyl carboxylic acid groups; mono-cyclic or bicyclic arylene group having from 6 to 10 carbon atoms optionally having up to six ring substitutions which may be the same and different, selected from the group consisting of $C_1$–$C_5$ alkyl; or a $C_1$–$C_2$ dialkyl ester or an anhydride of the said dicarboxylic acid;

d. the difunctional alcohol monomer has the formula:

$OH—R'''—OH$ wherein R''' is selected from the group consisting of: a straight or branched chain alklyene group having 2 to 20 carbon atoms; a cycloalkylene group having 5 to 8 carbon atoms; or a cycloalkylene group with straight chain or branched alkyl alcohol groups.

24. A pigment according to claim 23, wherein:
for the diamine monomer, R is a branched chain alkylene group of from 4 to 16 carbon atoms or a cycloalkylene group with straight chain or branched alkyl amino groups, said cycloalkylene having up to three ring substitutions, which may be the same or different, said ring substitution groups containing alkyl groups having 1 to 5 carbons atoms;
for the dicarboxylic acid monomer R' is a cycloalkylene group having up to three ring substitutions, which may be the same or different, said ring substitution groups containing alkyl groups having 1 to 5 carbon atoms;
for the alkanolamine, R" is a straight or branched chain alklyene group having 2 to 8 carbon atoms; and
for the difunctional alcohol monomer, R" is a cycloalkylene group having up to three ring substitutions, which may be the same or different, said ring substitution groups containing alkyl groups having 1 to 5 carbons atoms.

25. A pigment according to claim 23, wherein said fluorescent dye has the following structure:

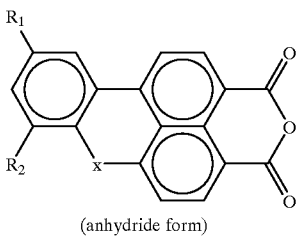

(anhydride form)

or

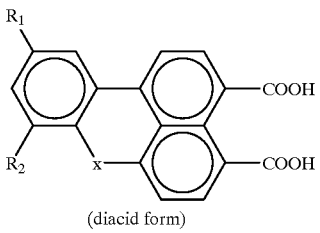

(diacid form)

wherein:
x is selected from the group consisting of: oxygen or sulfur;
$R_1$ is selected from the group consisting of: hydrogen; halogen; an alkyl group having 1 to 6 carbon atoms; an alkoxy group having 1 to 6 carbon atoms; or a carboalkoxy group having 1 to 6 carbon atoms;

R$_2$ is selected from the group consisting of: hydrogen; an alkyl group having 1 to 6 carbon atoms; or an alkoxy group having 1 to 6 carbon atoms.

26. A pigment according to claim 25, wherein x is oxygen, R$_1$ is hydrogen, and R$_2$ is hydrogen.

27. A pigment according to claim 26, wherein the first monomer is isophthalic acid the second monomer is isophorone diamine, the third monomer is cyclohexanedimethanol, and further comprising and polyethylene terephthalate.

28. A pigment according to claim 25, wherein the first monomer is isophthalic acid and the second monomer is 2-methylpentamethylenediamine.

29. A pigment according to claim 28, wherein the third monomer is cyclohexanedimethanol.

30. A pigment according to claim 25, wherein the first monomer is isophthalic acid and azelaic acid, and the second monomer is 1-amino-3-aminomethyl-3,5,5-trimethylcyclohexane, and the third monomer is cyclohexanedimethanol.

31. A pigment according to claim 25, wherein the first monomer is isophthalic acid and benzoic acid, the second monomer is ethylenediamine, and the third monomer is monoethanolamine.

32. A pigment according to claim 31, wherein the third monomer further comprises pentaerythritol.

33. A pigment according to claim 25, wherein the first monomer is isophthalic acid, the second monomer is monoisopropylamine, and the third monomer is cyclohexanedimethanol.

34. A pigment according to claim 25, wherein, the first monomer is a mixture of stearic acid and isophthalic acid, the second monomer is isophorone diamine, and the third monomer is pentaerythritol.

35. A pigment according to claim 23, further comprising a hindered amine light stabilizer.

36. A method for making a fluorescent pigment, comprising the following steps:

a. providing a fluorescent dye having following structure:

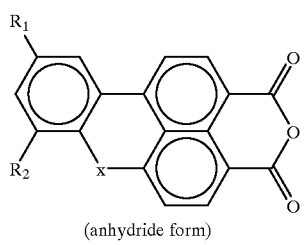
(anhydride form)

or

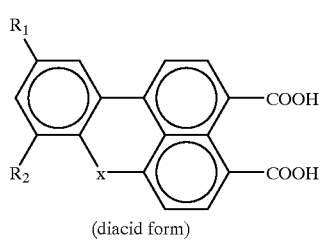
(diacid form)

wherein:
x is oxygen or sulfur;
R$_1$ is selected from the group consisting of: hydrogen; halogen; an alkyl group having 1 to 6 carbon atoms; an alkoxy group having 1 to 6 carbon atoms; or a carboalkoxy group having 1 to 6 carbon atoms;

R$_2$ is selected from the group consisting of: hydrogen; an alkyl group having 1 to 6 carbon atoms; or an alkoxy group having 1 to 6 carbon atoms;

b. providing a first monomer having at least two functional groups wherein at least one of said functional groups is an amine group; and c. providing a second monomer having at least two functional groups wherein at least one of said functional groups is a carboxy group;
wherein the monomer of step 2 and the monomer of step 3 may be the same molecule if and only if said same monomer has both an amine group and a carboxy group; and, d. providing from 0% to 49% of monomer having at least one alcohol group;

e. mixing the fluorescent dye, the monomer from step b, c, and d; polymerizing the monomers and the fluorescent dye to form a polymer having polyamide linkages, wherein said fluorescent dye is incorporated into the backbone of the polymer chain.

37. A fluorescent pigment comprising polymerized units of:

a. a fluorescent dye having the following structure:

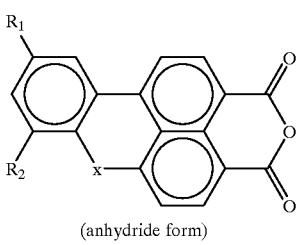
(anhydride form)

or

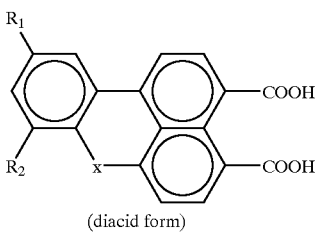
(diacid form)

wherein:
x is selected from the group consisting of: oxygen or sulfur;
R$_1$ is selected from the group consisting of: hydrogen; halogen; an alkyl group having 1 to 6 carbon atoms; an alkoxy group having 1 to 6 carbon atoms; or a carboalkoxy group having 1 to 6 carbon atoms;
R$_2$ is selected from the group consisting of: hydrogen; an alkyl group having 1 to 6 carbon atoms; or an alkoxy group having 1 to 6 carbon atoms;

b. a first monomer having at least two functional groups wherein at least one functional group is a carboxyl acid group;

c. a second monomer having at least two functional groups wherein at least one functional group is an alcohol group; wherein the monomer in b and c may be the same molecule if and only if said same molecule has both a carboxylic acid group and an alcohol group.

38. The pigment of claim 37, wherein: the monomers are selected from the group consisting of: dicarboxylic acid monomers, polyfunctional carboxylic acid monomers, carboxyl-alcohol monomers, difunctional alcohol monomers, polyfunctional alcohol monomers, and mixtures thereof.

39. The pigment of claim 38, wherein:
the monomers are selected from the group of difunctional alcohol monomer, and dicarboxylic monomer, wherein:
a. the dicarboxylic acid monomer has the formula:

wherein R' is selected from the group consisting of:
a straight or branched chain alkylene group having from 3 to 20 carbon atoms;
a cycloalkylene group having from 5 to 8 carbon atoms;
mono-cyclic or bicyclic arylene group having from 6 to 10 carbon atoms optionally having up to six ring substitutions which may be the same and different, selected from the group consisting of $C_1$–$C_5$ alkyl; or a $C_1$–$C_2$ dialkyl ester or an anhydride of the said dicarboxylic acid;
b. wherein the difunctional alcohol monomer has the formula:

wherein R'" is selected from the group consisting of:
a straight or branched chain alklyene group having 2 to 20 carbon atoms or a cycloalkylene group having 5 or 6 carbon atoms.

40. A pigment according to claim 39, wherein: the dicarboxylic acid monomer R' is a cycloalkylene group having up to three ring substitutions, which may be the same or different, said ring substitution groups containing alkyl groups having 1 to 5 carbon atoms; and R'" is a cycloalkylene group having up to three ring substitutions, which may be the same or different, said ring substitution groups containing alkyl groups having 1 to 5 carbons atoms.

41. A pigment according to claim 37, wherein x is oxygen, $R_1$ is hydrogen, and $R_2$ is hydrogen.

42. A pigment according to claim 37, wherein the first monomer is isophthalic acid and the second monomer is a mixture of trimethylolpropane and cyclohexanedimethanol.

43. A pigment according to claim 42, wherein the first monomer further comprises terephthalic acid.

44. A pigment according to claim 37, wherein the first monomer is dimethylterephthalate and the second monomer is a mixture of trimethylolpropane and cyclohexanedimethanol.

45. A pigment according to claim 44, further comprising a hindered amine light stabilizer.

* * * * *